(12) United States Patent
Rilling et al.

(10) Patent No.: US 6,645,274 B2
(45) Date of Patent: Nov. 11, 2003

(54) DEVICE FOR DETERMINING AT LEAST ONE PARAMETER OF A FLOWING GAS-LIQUID MIXTURE OR USING A FLOW RECTIFIER AS A CONDENSATION TRAP OR METHOD FOR CONDENSING A LIQUID

(75) Inventors: Heinz Rilling, Eberdingen (DE); Gerhard Hueftle, Aspach (DE); Thomas Lenzing, Benningen (DE); Hans Beyrich, Freiberg (DE); Roland Mueller, Steinheim (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,063

(22) PCT Filed: Feb. 26, 2001

(86) PCT No.: PCT/DE01/00714

§ 371 (c)(1),
(2), (4) Date: Apr. 3, 2002

(87) PCT Pub. No.: WO01/63220

PCT Pub. Date: Aug. 30, 2001

(65) Prior Publication Data

US 2002/0134245 A1 Sep. 26, 2002

(30) Foreign Application Priority Data

Feb. 26, 2000 (DE) .......................................... 100 09 153

(51) Int. Cl.$^7$ ............................................... B01D 35/30
(52) U.S. Cl. ........................... 95/267; 95/290; 96/413; 73/202.5
(58) Field of Search ...................... 95/267, 290; 96/413; 73/202, 202.5

(56) References Cited

U.S. PATENT DOCUMENTS

| 4,299,124 A | * | 11/1981 | Knapp et al. | ............. 73/204.27 |
| 4,942,763 A | * | 7/1990 | Harpster | .................... 73/202.5 |

FOREIGN PATENT DOCUMENTS

| DE | 042 37 224 | 5/1994 |
| DE | 043 38 891 | 9/1994 |
| DE | 043 17 312 | 12/1994 |
| DE | 196 47 081 | 5/1998 |
| DE | 197 11 939 | 9/1998 |
| DE | 197 31 420 | 1/1999 |
| EP | 0 458 998 | 5/1990 |

* cited by examiner

*Primary Examiner*—Robert A. Hopkins
(74) *Attorney, Agent, or Firm*—Kenyon & Kenyon

(57) ABSTRACT

A device and method for determining at least one parameter of a flowing gas-liquid mixture, including parameters of the intake air of internal combustion engines, uses a condensation trap to protect a measuring element from back flowing liquids, downstream from the measuring element.

5 Claims, 3 Drawing Sheets

DEVICE FOR DETERMINING AT LEAST ONE PARAMETER OF A FLOWING GAS-LIQUID MIXTURE OR USING A FLOW RECTIFIER AS A CONDENSATION TRAP OR METHOD FOR CONDENSING A LIQUID

FIELD OF THE INVENTION

The present invention relates to a device for determining at least one parameter of a flowing gas-liquid mixture, to the use of a flow straightener as a condensation trap, and/or to a method for condensing a liquid.

BACKGROUND INFORMATION

A device is discussed in European Patent Application No. 0 458 998 for determining the intake-air volume of an internal combustion engine, the intake-air flowing around a measuring element in a main flow direction. As characterized, a flow straightener having a plurality of openings is present upstream from the measuring element. Downstream from the measuring element is a grating for protecting the measuring element from mechanical influences, such as, for example, from direct hand contact. A mesh aperture of the grating is specially produced in a wide-meshed manner. While the device is in operation, oil drops or oil vapor can, for example, flow in the air against the main flow direction and contaminate the measuring element, which may significantly worsen the measuring properties of the measuring element. The backflow of liquids may result from pulsating flows or from a turbo-charger running on in the stopping phase. The inner surface of the protective grating having a special wide-meshed design, may not be sufficient as a condensation surface for the liquid.

A device is discussed in German Published Patent Application No. 196 47 081 for determining the volume of a flowing medium, in which a grid possesses flow openings having, at least regionally, different flow cross sections. However, the grid is situated upstream from the measuring element.

SUMMARY OF THE INVENTION

In contrast, the exemplary device according to the present invention, the use of an exemplary flow straightener according to the present invention as a condensation trap, and/or the exemplary method for condensing a liquid according to the present invention may have the advantage that a measuring element is protected from contamination in a simple manner.

An element having an enlarged inner surface downstream from the measuring element may be used as a condensation trap in a simple, mechanical manner.

A flow straightener may also be used as the condensation trap by an inexpensive and simple modification.

An exemplary embodiment includes integrating the condensation trap in a tubular member, which may result in a reduction in production costs and in the number of parts to be assembled.

A flow straightener may also be used upstream from the measuring element to provide good flow conditions.

To effectively protect the measuring element from liquid and solid particles, it may be advantageous to integrate a protective grid at least regionally in the flow straightener upstream from the measuring element.

A protective half-pipe may also be used to shield an opening of a tubular member from liquid and solid particles, so that a protective function of the measuring element may be achieved.

DETAILED DESCRIPTION

Figure 1:
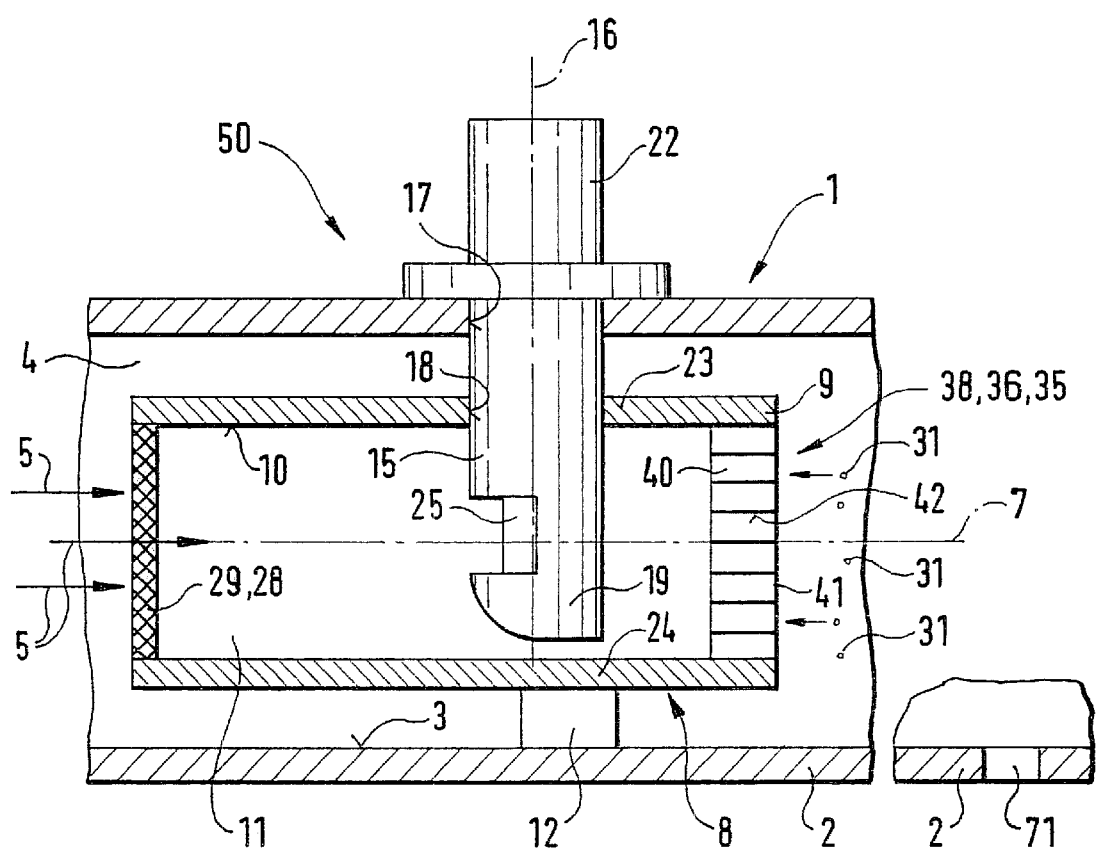
FIG. 1 shows a first exemplary device according to the present invention for determining at least one parameter of a flowing gas-liquid mixture.

FIG. 1 shows a partial sectional view of a first exemplary embodiment of a device 50 for determining at least one parameter of a gas-liquid mixture flowing in a line, such as an intake-air volume of an internal combustion engine.

Reference numeral 1 designates a line that may form a direct segment of the intake pipe of the internal combustion engine or that is an independent component part that can be connected to the intake pipe of the internal combustion engine. In either case, line 1 is downstream from an air filter (not shown) on its "clean room" side. The air filter is used for filtering the intake air of the internal combustion engine of a motor vehicle and is intended to prevent, as thoroughly as possible, dirt particles or liquid from entering into the intake pipe.

A crankcase ventilation line 71 may be connected to line 1. As a result of oil expanding in the crankcase of the internal combustion engine, oil from the crankcase may continuously enter the line via the crankcase ventilation line in a gaseous form or as fine oil drops. In this context, there is the danger of measuring element 25 becoming contaminated in an undesired manner by oil particles. When the engine is in operation, the upstream measuring element 25 may only be contaminated to a small extent, since the oil may not be capable of moving upstream due to the high flow velocity of the intake air. When the internal combustion engine is not in operation, the intake flow is lacking and the expanding gas-oil mixture of the crankcase may move in every direction, including towards the measuring element 25, which may contaminate the measuring element 25.

Line 1 possesses a line wall 2, which has an inner wall 3, with which it encloses flow channel 4, through which the intake air of the internal combustion engine flows in flow direction 5, which is indicated by arrows. Situated in line 1 is a tubular member 8, which, for example, is aligned in flow direction 5 and runs concentrically with respect to center line 7 of pipe 1. Tubular member 8 has a wall 9, whose inner channel wall 10 bounds a flow-through channel 11 in tubular member 8, through which part of the air drawn in flow direction 5 flows. Tubular member 8 may be held, for example, by at least two flat, plate-like shaped braces 12, which extend between inner wall 3 of line 1 and wall 9 of tubular member 8, at a right angle to flow direction 5. In addition to holding tubular member 8 in the air flow between line 1 and tubular member 8, braces 12 cause the pressure drop to increase, which increases air quantity flowing through flow-through channel 11. Braces 12 also straighten the intake-air flow in a desired manner.

The air volume drawn in by the internal combustion engine can be randomly changed by a throttle valve (not shown) situated downstream from tubular member 8, in the intake pipe of the internal combustion engine. A parameter of the flowing gas-liquid mixture to be measured may be the volume of the gas-liquid mixture flowing per unit time (volumetric flow), e.g., the intake air volume of an internal combustion engine. To ascertain the intake air volume of the internal combustion engine, a measuring body 15 is provided that has an essentially oblong, rectangular design and extends along a longitudinal axis 16. Longitudinal axis 16 runs essentially perpendicularly to center line 7 and, as such, perpendicularly to flow direction 5. Measuring body 15 is partially inserted through a holding opening 17 in line wall 2 and through an insertion opening 18 in wall 9 of tubular member 8 and projects at a measuring end 19 into flow-through channel 11. In this context, a plug end 22 of measuring body 15 for receiving electrical connections (e.g., plug studs) remains outside of line 1. Insertion opening 18 of tubular member 8 is formed in a first wall segment 23, opposite which, in the direction of longitudinal axis 16, is a second wall segment 24 of the tubular member 8. Provided in measuring end 19 of measuring body 15 is at least one measuring element 25, which is in contact with the air flowing through flow-through channel 11, and via which the air mass drawn in by the internal combustion engine is determined. Measuring element 25 may be configured in any available manner, e.g., in the form of thermally coupled, temperature-dependent resistors. For example, as referred to in German Published Patent Application No. 43 38 891, the measuring element 25 may be configured as a micromechanical component part having a dielectric membrane on which the resistor elements are formed.

Other parameters of the gas-liquid mixture may be measured. These other parameters include, but are not limited to, temperature, pressure, and the like. For this purpose, measuring elements 25 may be designed as in German Published Patent No. 42 37 224 or German Published Patent Application Nos. 43 17 312, 197 11 939, and 197 31 420.

To prevent measuring element 25 from being acted upon in an undesired manner by dirt particles or liquid, a first protective element 28 (e.g., a protective screen 29) is situated at least partially upstream from measuring element 25, such as, for example, within flow-through channel 11 of tubular member 8. Protective screen 29 may be formed, for example, from plastic and integrated in tubular member 8 or in line 1. This may be done, for example, by producing protective screen 29 and tubular member 8 in an injection molding process.

As discussed above, liquids and particles from main flow direction 5 travel against the flow direction to reach measuring element 25, such as occurs when the intake flow is lacking. This backflow is prevented by arranging and using at least one condensation trap 36. For example, condensation trap 36 may be a section of flow channel 4 that is actively cooled, thereby condensing liquids. An element 35, which provides an enlarged inner surface which promotes the condensation of a liquid (e.g., a screen), may also be used as condensation trap 36.

Situated downstream from measuring element 25 in tubular member 8 is a flow straightener 38 of any suitably appropriate construction, which extends, for example, perpendicularly to flow direction 5 through flow-through channel 11 of tubular member 8, and which ensures an air flow that is as uniform as possible at and around measuring element 25. In comparison with other flow straighteners, flow straightener 38 for use as condensation trap 36 may be constructed a bit longer in the flow direction (e.g. two centimeters) or may include more straightener channels 40. Flow straightener 38 includes a plurality of straightener channels 40 having inner surfaces 42. These inner surfaces 42 may provide a significantly larger condensation surface for the oil vapor or oil moisture than just the existing inner wall channel 10. Also, the condensation surface may be distributed over the entire flow cross section of tubular member 8, so that almost no oil passes flow straightener 38, which may result in significantly less contamination of measuring element 25.

Figure 2:
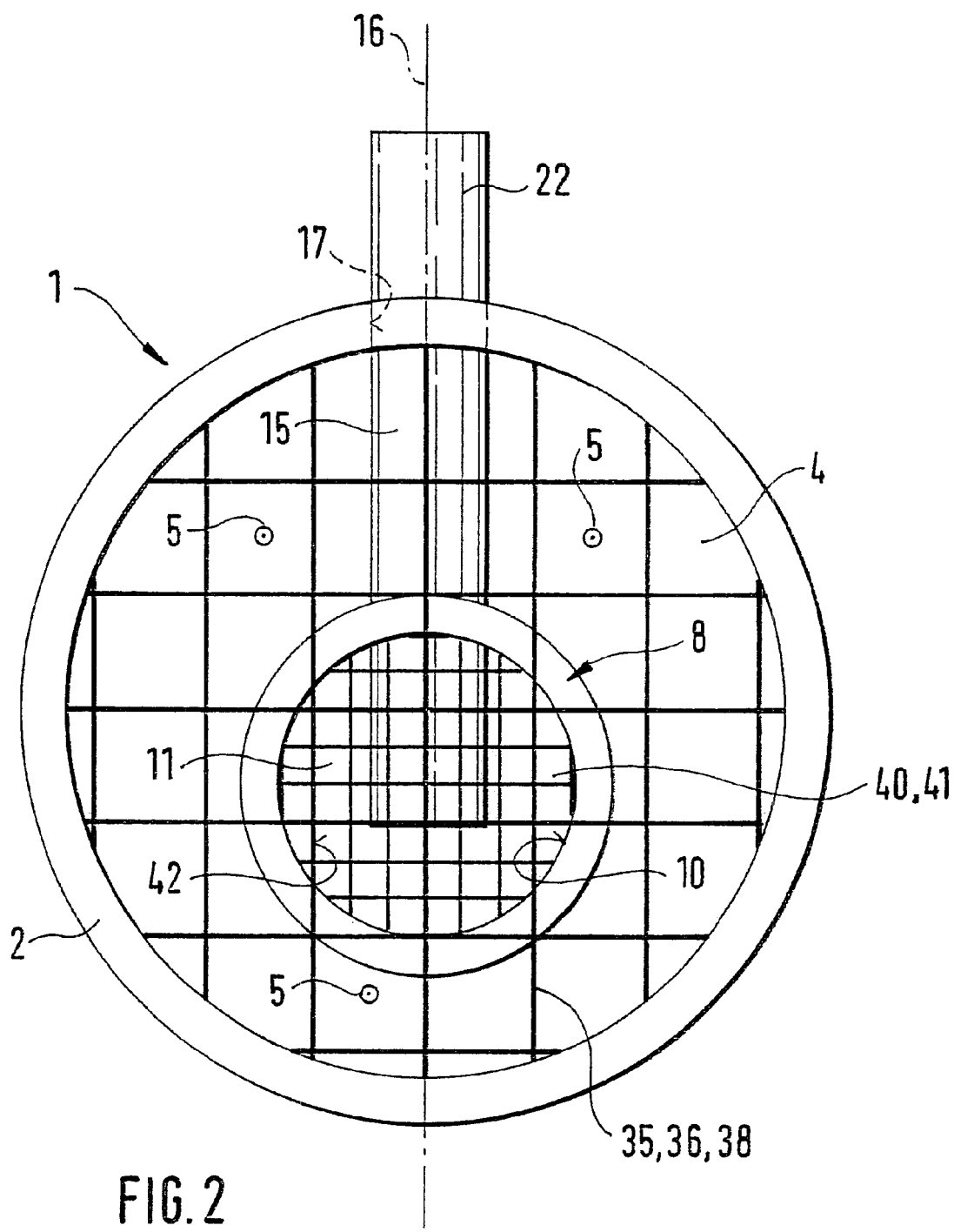
FIG. 2 shows another exemplary device according to the present invention.

FIG. 2 illustrates another exemplary embodiment of device 50 according to the present invention. The same reference numerals are used in the following figure descriptions for identical or equally acting parts. Flow straightener 38, for example, extends beyond tubular member 8 to inner wall 3 of line 2, and includes straightener channels 40 having different flow cross sections, e.g., in one plane perpendicular to center line 7 and parallel to plug axis 16. Straightener channels 40 are designed in a region of tubular member 8 such that enlarged condensation surfaces are available. The width of straightener channels 40, including openings 41, is large enough in the region around tubular member 8 so that the flow should not be noticeably affected. At the same time, flow straightener 38 can be integrated with tubular member 8 and line wall 2 so that flow straightener 38 assumes the function of braces 12.

Figure 3:
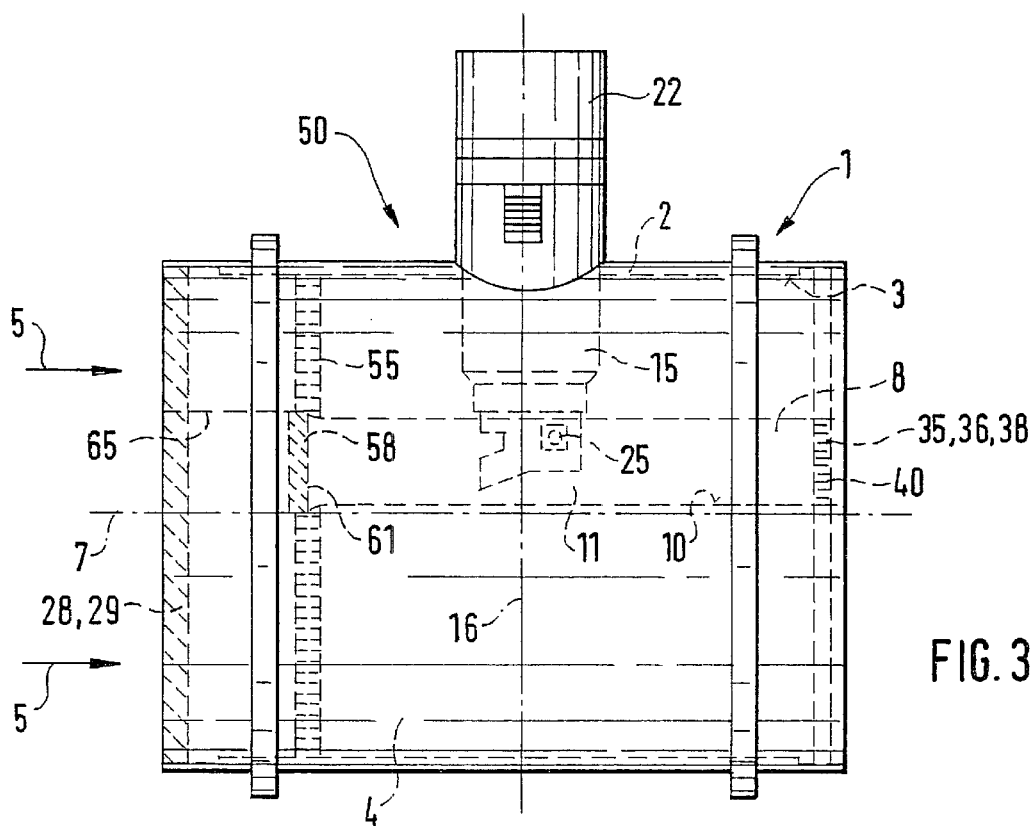
FIG. 3 shows still another exemplary device according to the present invention.

FIG. 3 illustrates another exemplary embodiment of the device according to the present invention. Protective grid 29 extends upstream from measuring element 25 and tube member 8, across the entire cross section of flow channel 4. Situated at the level of an input opening 61 of flow-through channel 11 of tubular member 8 (i.e., downstream from protective grid 29) is at least one second flow straightener 55. In this embodiment, only one second flow straightener 55 is present. A second protective element 58, which is used to reduce the action of liquid or solid particles on measuring element 25, is integrated, such that it covers the entire cross section of input opening 61 and abuts directly against input opening 61. Second protective element 58 may be a protective grid, for example. A protective half-pipe 65 is connected upstream directly to opening 61 and runs in the axial direction to protective grid 29. In this context, protective half-pipe 65 is situated such that liquids and solid particles flowing from protective grid 29 to input opening 61 hit the protective half-pipe's outer surface, so that they should not enter tubular member 8 and reach measuring element 25.

Figure 4:
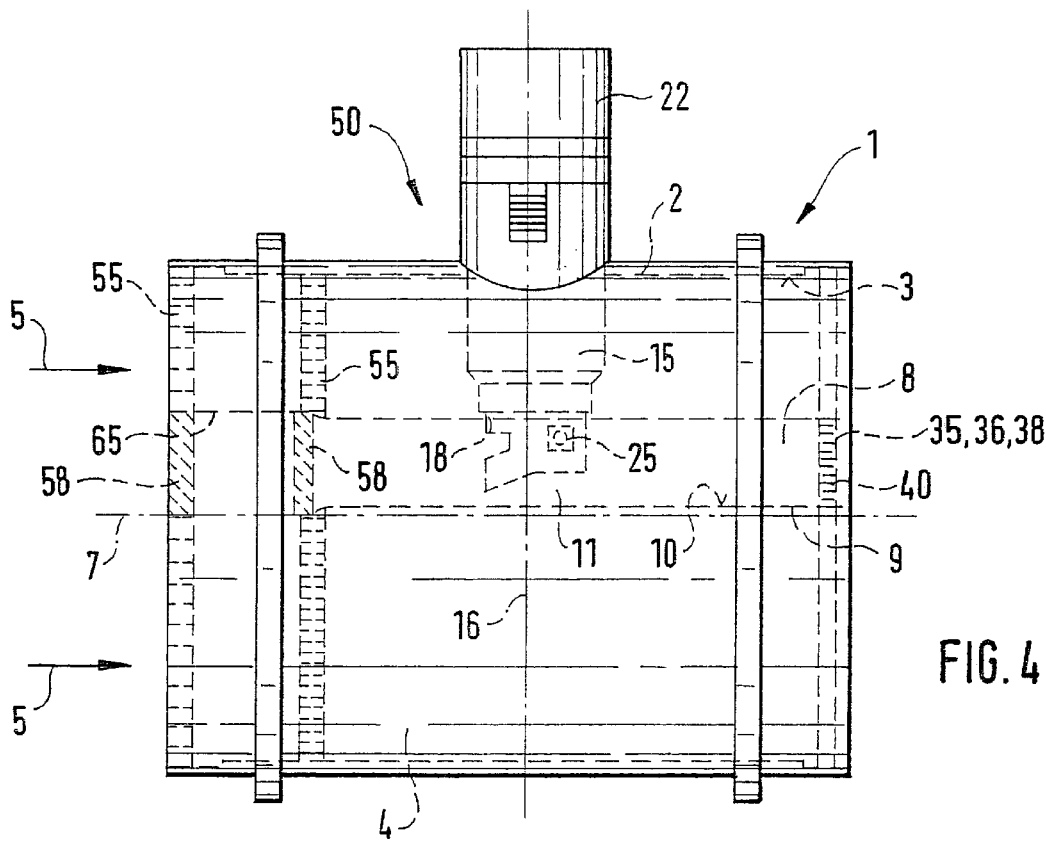
FIG. 4 shows yet another exemplary device according to the present invention.

FIG. 4 illustrates another exemplary embodiment of the device according to the present invention. In contrast to FIG. 3, the protective grid of FIG. 4 is configured as an additional, second flow straightener 55, in which a second protective element 58 is regionally integrated. As viewed from main flow direction 5, second protective element 58 covers input opening 61 of tubular member 8 in an aligned manner.

The exemplary embodiments of FIGS. 3 and 4 should provide a significantly higher degree of rejection of liquids and solid particles and guarantee an extended service life of measuring element 25, such as a longer kilometer guarantee of an air volume meter of an internal combustion engine in a motor vehicle. Measuring body 15, tubular member 8, line 1, protective half-ring 65, or flow straightener 38, 55 as well as additional parts of the device may be made of plastic or metal, for example.

What is claimed is:

1. A device for determining at least one parameter of a gas-liquid mixture, the gas-liquid mixture including gas particles and at least one liquid flowing in an intake air line of an internal combustion engine, the device comprising:

a tubular member extending in the line and having a flow-through channel;

a measuring element situated in the flow-through channel and around which the gas-liquid mixture flows; and a condensation trap for trapping the at least one liquid, and being situated downstream from the measuring element;

wherein the condensation trap includes a flow straightener; and wherein the flow straightener occupies the entire cross section of the line, and wherein the flow straightener includes straightener channels having a smaller cross section within a region of the flow-through channel than that of the region outside the flow-through channel.

2. A device for determining at least one parameter of a gas-liquid mixture, the gas-liquid mixture including gas particles and at least one liquid flowing in an intake air line of an internal combustion engine, the device comprising:

a tubular member extending in the line and having a flow-through channel;

a measuring element situated in the flow-through channel and around which the gas-liquid mixture flows;

a condensation trap for trapping the at least one liquid, and being situated downstream from the measuring element; and at least one protective element situated in the line upstream from the measuring element, to reduce the action of at least one of liquid particles and solid particles on the measuring element.

3. The device of claim 2, wherein the at least one protective element includes a protective grid located in at least one of the line and the tubular member.

4. A device for determining at least one parameter of a gas-liquid mixture, the gas-liquid mixture including gas particles and at least one liquid flowing in an intake air line of an internal combustion engine, the device comprising:

a tubular member extending in the line and having a flow-through channel;

a measuring element situated in the flow-through channel and around which the gas-liquid mixture flows;

a condensation trap for trapping the at least one liquid, and being situated downstream from the measuring element; and at least one flow straightener situated in the line upstream from the measuring element;

wherein the flow straightener includes at least one second protective element to reduce, within the region of the flow-through channel, the action of at least one of liquid particles and of solid particles on the measuring element.

5. A device for determining at least one parameter of a gas-liquid mixture, the gas-liquid mixture including gas particles and at least one liquid flowing in an intake air line of an internal combustion engine, the device comprising:

a tubular member extending in the line and having a flow-through channel;

a measuring element situated in the flow-through channel and around which the gas-liquid mixture flows; and a condensation trap for trapping the at least one liquid, and being situated downstream from the measuring element;

wherein the tubular member includes an input opening in a main flow direction, and at least one protective half-pipe is provided upstream from the input opening.

* * * * *